US010546329B2

(12) United States Patent
Albrecht et al.

(10) Patent No.: US 10,546,329 B2
(45) Date of Patent: Jan. 28, 2020

(54) SYSTEMS AND METHODS FOR EVALUATING MEDICAL BILLING

(71) Applicant: CorVel Corporation, Irvine, CA (US)

(72) Inventors: Corey D. Albrecht, Fort Worth, TX (US); Brad Whitley, Fort Worth, TX (US); Steve Sutherland, Fort Worth, TX (US)

(73) Assignee: CorVel Corporation, Irvine, CA (US)

(*) Notice: Subject to any disclaimer, the term of this patent is extended or adjusted under 35 U.S.C. 154(b) by 619 days.

(21) Appl. No.: 14/092,124

(22) Filed: Nov. 27, 2013

(65) Prior Publication Data

US 2015/0149194 A1 May 28, 2015

(51) Int. Cl.
*G06Q 30/04* (2012.01)
*G06Q 50/22* (2018.01)

(52) U.S. Cl.
CPC ............. *G06Q 30/04* (2013.01); *G06Q 50/22* (2013.01)

(58) Field of Classification Search
CPC .................... G06Q 50/22; G06Q 50/24; G06F 19/322–327; G16H 10/00; G16H 10/20; G16H 10/40; G16H 10/60; G16H 10/65; G16H 15/00; G16H 20/00; G16H 20/10; G16H 20/13; G16H 20/17; G16H 20/30; G16H 20/40; G16H 20/60; G16H 20/70; G16H 20/90; G16H 30/00
USPC ........................................................ 705/2–4
See application file for complete search history.

(56) References Cited

U.S. PATENT DOCUMENTS

| 6,061,657 A * | 5/2000 | Whiting-O'Keefe ....................... G06F 19/328 702/179 |
| 7,890,356 B1* | 2/2011 | Drucker ................ G06F 19/328 600/300 |
| 2002/0083075 A1* | 6/2002 | Brummel ................ G06Q 50/22 |
| 2003/0191665 A1* | 10/2003 | Fitzgerald ............. G06F 19/328 705/2 |
| 2005/0102170 A1* | 5/2005 | Lefever .................. G06Q 40/08 705/4 |
| 2009/0132396 A1* | 5/2009 | Wexler ................... G06Q 30/04 705/30 |

(Continued)

OTHER PUBLICATIONS

"837 Health Care Claim Companion Guide Professional and Institutional", version 1.14, Nov. 2010.*

(Continued)

Primary Examiner — Mark Holcomb

(57) ABSTRACT

Systems and methods for providing medical information are provided in which a medical bill and line items summarized by the bill are received from a care provider. A revenue code in the bill and a subset of line items associated with it is identified. Respective line items are matched to corresponding generic description codes using a lookup table, thereby identifying generic codes for the line items. The generic codes are used to determine whether each line item is validly associated with the revenue code. A median charge for each line item is calculated based on historical charges by medical care providers in a relevant geographic region. A report is provided that provides, for each line item, the actual charge for the item from the bill, the median charge for the line item, and any flag indicating that the line item is potentially not validly associated with the corresponding revenue code.

22 Claims, 14 Drawing Sheets

(56) References Cited

U.S. PATENT DOCUMENTS

2012/0130754 A1* 5/2012 Lesswing ............... G06Q 10/10
                                                       705/4
2016/0019356 A1* 1/2016 Martin .................. G06F 19/322
                                                       705/2

OTHER PUBLICATIONS

Leary, Renee, and Dean E. Farley. "Medicare's outpatient code editor is key to APC payments." Healthcare Financial Management 55.7 (2001): 44-44. (Year: 2001).*

* cited by examiner

| Field location UB-04 | Description | Inpatient | Outpatient |
|---|---|---|---|
| 1 | Provider Name and Address | Required | Required |
| 2 | Pay-To Name and Address | Situational | Situational |
| 3a | Patient Control Number | Required | Required |
| 3b | Medical Record Number | Situational | Situational |
| 4 | Type of Bill | Required | Required |
| 5 | Federal Tax Number | Required | Required |
| 6 | Statement Covers Period | Required | Required |
| 7 | Future Use | N/A | N/A |
| 8a | Patient ID | Situational | Situational |
| 8b | Patient Name | Required | Required |
| 9 | Patient Address | Required | Required |
| 10 | Patient Birthdate | Required | Required |
| 11 | Patient Sex | Required | Required |
| 12 | Admission Date | Required | Required, if applicable |
| 13 | Admission Hour | Required | Required, if applicable |
| 14 | Type of Admission/Visit | Required | Required |
| 15 | Source of Admission | Required | Required |
| 16 | Discharge Hour | Required | N/A |
| 17 | Patient Discharge Status | Required | Required |
| 18-28 | Condition Codes | Required, if applicable | Required, if applicable |
| 29 | Accident State | Situational | Situational |
| 30 | Future Use | N/A | N/A |
| 31-34 | Occurrence Codes and Dates | Required, if applicable | Required, if applicable |
| 35-36 | Occurrence Span Codes and Dates | Required, if applicable | Required, if applicable |
| 37 | Future Use | N/A | N/A |
| 38 | Responsible Party Name and Address | Required, if applicable | Required, if applicable |
| 39-41 | Value Codes and Amounts | Required, if applicable | Required, if applicable |
| 42 | Revenue Code | Required | Required |
| 43 | Revenue Code Description | Required | Required |
| | NDC Code | Required, if applicable | Required, if applicable |

Fig. 6A
(Prior Art)

| Field location UB-04 | Description | Inpatient | Outpatient |
|---|---|---|---|
| 44 | HCPCS/Rates | Required, if applicable | Required, if applicable |
| 45 | Service Date | N/A | Required |
| 46 | Units of Service | Required | Required |
| 47 | Total Charges (By Rev. Code) | Required | Required |
| 48 | Non-Covered Charges | Required, if applicable | Required, if applicable |
| 49 | Future Use | N/A | N/A |
| 50 | Payer Identification (Name) | Required | Required |
| 51 | Health Plan Identification Number | Situational | Situational |
| 52 | Release of Info Certification | Required | Required |
| 53 | Assignment of Benefit Certification | Required | Required |
| 54 | Prior Payments | Required, if applicable | Required, if applicable |
| 55 | Estimated Amount Due | Required | Required |
| 56 | NPI | Required | Required |
| 57 | Other Provider IDs | Optional | Optional |
| 58 | Insured's Name | Required | Required |
| 59 | Patient's Relation to the Insured | Required | Required |
| 60 | Insured's Unique ID | Required | Required |
| 61 | Insured Group Name | Situational | Situational |
| 62 | Insured Group Number | Situational | Situational |
| 63 | Treatment Authorization Codes | Required, if applicable | Required, if applicable |
| 64 | Document Control Number | Situational | Situational |
| 65 | Employer Name | Situational | Situational |
| 66 | Diagnosis/Procedure Code Qualifier | Required, if applicable | Required, if applicable |
| 67 | Principal Diagnosis Code/Other Diagnosis Codes | Required | Required |
| 68 | Future Use | N/A | N/A |
| 69 | Admitting Diagnosis Code | Required | Required, if applicable |
| 70 | Patient's Reason for Visit Code | Situational | Situational |
| 71 | PPS Code | Situational | Situational |
| 72 | External Cause of Injury Code | Situational | Situational |
| 73 | Future Use | N/A | N/A |
| 74 | Principal Procedure Code/Date | Required, if applicable | Required, if applicable |
| 75 | Future Use | N/A | N/A |
| 76 | Attending Name/ID-Qualifier 1G | Required | Required |
| 77 | Operating ID | Situational | Situational |
| 78-79 | Other ID | Situational | Situational |
| 80 | Remarks | Situational | Situational |
| 81 | Code-Code Field/Qualifiers | | |
| | *0-A0 | N/A | N/A |
| | *A1-A4 | Situational | Situational |
| | *A5-AB | N/A | N/A |
| | AC - Attachment Control number | Situational | Situational |
| | AD-B0 | N/A | N/A |
| | *B1-B2 | Situational | Situational |
| | *B3 | Required | Required |

Fig. 6B
(Prior Art)

| GenBric | Description | QN | Diff | Charge | UCLoc | Bamp | Ext. Chrg | Acc | Adj | Cnt | A |
|---|---|---|---|---|---|---|---|---|---|---|---|
| GPOFTM | SURGERY LEVEL 4 181-240 (MIN) | 240.00 | 388.40 | 7292 | 7666Z | 22 | 1750.00 | ☐ | - | 0 | ☐ |
| LPGI | STAPLER ENDO/4.25 MM VASCULAR | 1.00 | 383.16 | 440.00 | 1466.84A | 4 | 440.00 | ☑ | 13 | 1 | ☐ |
| | DESTINATOR HOUR MONITORED | 2.00 | 386.98 | 160.00 | | 2 | 320.00 | ☑ | | 1 | ☐ |
| METRPET | KIT ENDOSCOPIC METRX SYSTEM (SUPP) | 1.00 | 2616.48 | 2000.00 | 4616.48N | 11 | 200.00 | ☑ | 13 | 0 | ☐ |
| PHNTIHF | FIBRIN SEALANT TISSEEL | 3.00 | 4245.00 | 635.00 | 2050.00S | 9 | 1905.00 | ☑ | - | 1 | ☐ |
| PHCPM | RECOVERY ROOM 60 MINUTES | 60.00 | 364.60 | 24.00 | | | 1440.00 | ☑ | - | 0 | ☐ |
| GPANMAT | ANES MATL 240 MIN | 240.00 | -164.80 | 5.63 | 12.47/S | 6 | 1350.00 | ☑ | 3 | 0 | ☐ |
| CD | DRAPE C-ARM | 5.00 | 516.00 | 128.00 | 2469.4 | 5 | 640.00 | ☑ | 3 | 0 | ☐ |
| PMINCD | INTERCEED ADHESION BARR | 1.00 | -211.63 | 800.00 | 811.63S | 4 | 600.00 | ☑ | - | 0 | ☐ |
| PHR110857 | FORANE 100 M FOR ANES | 1.00 | 433.51 | 488.00 | 54.49N | 22 | 488.00 | ☑ | 3 | 1 | ☐ |
| PKNR | NEURO PACK | 1.00 | 218.56 | 470.00 | 251.44S | 5 | 470.00 | ☑ | 3 | 1 | ☐ |
| | SURGICEL MESH 4X8 | 1.00 | 354.72 | 385.00 | | 7 | 385.00 | ☑ | - | 1 | ☐ |
| RSF | | 1.00 | 100.56 | 381.00 | | 6 | 381.00 | ☑ | 1 | 1 | ☐ |
| PHR110795 | | 4.00 | 65.00 | 91.00 | | 4 | 364.00 | ☑ | 4 | 1 | ☐ |
| 0200PH | OZ PER HOUR | 5.00 | 100.75 | 72.00 | 16.05/Z | 26 | 360.00 | ☑ | 1 | 1 | ☐ |
| MPD | PUMP INFUSION PDA | 2.00 | 140.00 | 168.00 | 86.00A | 6 | 336.00 | ☑ | 4 | 0 | ☐ |
| PHR117988 | THROMBINAR 5000 UNITS | 1.00 | -51.25 | 306.00 | 357.35Z | 5 | 306.00 | ☑ | - | 0 | ☐ |
| GST | GOWN STERILE | 4.00 | 27.00 | 72.00 | 9.25A | 20 | 288.00 | ☑ | 4 | 0 | ☐ |
| CNI | FLUOROSCOPY | 1.00 | 320.43 | 243.00 | 563.43S | 20 | 243.00 | ☑ | - | 0 | ☐ |
| | SUTURES | 6.00 | 35.60 | 40.00 | | 12 | 240.00 | ☑ | 4 | 0 | ☐ |
| | ELECTRODES | 5.00 | 160.00 | 48.00 | 10.00A | 19 | 240.00 | ☑ | 8 | 0 | ☐ |
| LPP | PACK LAPAROTOMY | 2.00 | 59.18 | 115.00 | 144.59A | 4 | 230.00 | ☑ | 3 | 0 | ☐ |
| EPCATH | CATHETER EPIDURAL SET | 1.00 | 97.74 | 219.00 | 121.26N | 34 | 219.00 | ☐ | - | 0 | ☐ |

SYSTEMS AND METHODS FOR EVALUATING MEDICAL BILLING

TECHNICAL FIELD

The disclosed embodiments relate generally to systems and methods for evaluating medical billing.

BACKGROUND

The National Uniform Billing Committee (NUBC) was established in 1975 by the American Hospital Association with the mandate to simplify healthcare billing in the U.S. and develop one standard, nationally-accepted billing form. After years of technical data and policy debate, the NUBC voted in 1982 to accept the UB-82 and its associated data manual for implementation as a national uniform bill. The UB-82 standard has now evolved into the UB-04 standard which has been approved for use in the United States since 2007. Accordingly, the UB-04 claim form, also known as the CMS-1450 form, is presently the standard, uniform bill (UB) for institutional healthcare providers that are used throughout the United States to bill third party payers such as insurance companies. FIG. 6 provides an example of the field descriptions that are found in a UB-04 form.

The UB-04 claim form requires use of codes maintained by the NUBC. Examples of such codes are condition codes, occurrence codes, occurrence span codes, value codes and revenue code. Examples of revenue codes (field 42 of the UB-04) include for example 0210 coronary care, 0211 myocardial infarction, 0300 laboratory, 0301 chemistry, 0302 immunology, 0110 room/board—PVT, 0111 Room Board Medical/surgical/gyn. A full listing of revenue codes is found in the Official UB-04 Data Specifications Manual 2014, product code PM2014, which is licensed by the American Hospital Association and which is hereby incorporated by reference herein in its entirety.

Accordingly, the UB-04 is the form that the government demands that the care givers, such as hospitals, use to bill. Moreover, the form is very uniform. When using such forms, care givers also itemize out specific charges for each revenue code. Thus, each respective revenue code in the UB-04 filled out by a care provider and invoiced to a third part is actually a summary of line item charges associated with the respective revenue code. For instance, in the case of the revenue code 0211, myocardial infarction, the UB-04 data will list revenue code 0211, myocardial infarction, and the total charge for this revenue code. The UB-04 does not have field codes for the itemized line item charges under the revenue codes and thus such line item charges are provided separately. Unlike the UB-04 structure which is highly uniform, there is no uniform charge master for the itemization line items. That is, care giver itemizations are not governed by a standard. Any care giver can bill line items any way they like and mainly use as an internal inventory for UB-04 creation by internal billing personnel, post discharge of patient. For example, if a hospital bills for a surgical procedure on the UB-04, it would be under a revenue code under operating room. Under this revenue code would be a number of itemization line item charges that are separate when billed on the itemization.

While a number of regulations govern some of what itemization line items may be billed under which revenue codes, the lack of any standard for line item nomenclature, and the transparency of what itemization line items are charged on the UB-04 form, gives rise to problems. For instance, because there is no standard nomenclature for line items associated with revenue codes, medical claim payers have no effective means of verifying that such line items are validly associated with their corresponding revenue codes. A line item is often not validly associated with a revenue code when such line items are deemed to be unbundled or redundant. These are items that should have been included in the area or primary service in which they were used. For example, consider the case of an operation that falls under a specific operation revenue code in which the primary service charge for the revenue code is the operation. Line items for routine items that are billed separately and in addition to the primary service charge, as well as billing for use of standard capital equipment in the operating room that were used to facilitate the operation, should not be billed separately as line items. Rather such items should have been included in the charge for operating room per hour. However, because of the vast number of different ways that each medical item or procedure can be validly named, there is no satisfactory method for payers to analyze the numerous line items associated with each of the revenue codes on UB-04 forms in order to make sure that each such line item is validly associated with the corresponding revenue codes.

Another problem that arises due to the lack of uniformity in line item nomenclature is the determination of whether such line item charges (e.g., the charge for the corresponding line item that the care provider imposes) are excessive beyond a reasonable and customary rate. One metric that can be used for such an evaluation is to determine a reasonable and customary price or rate for each possible line item. In the UB format, this is a difficult task and satisfactory methods for achieving such a task are lacking in the art. There are hundreds of valid revenue codes available for the UB-04, and for each such revenue code, many different possible itemization line items, and combinations thereof. The pricing of each such line item is driven by potentially different market conditions. For instance, certain medical items are made of raw materials whose costs fluctuate over time. This drives the care giver to adjust the charge for an appropriate markup. Thus, it is necessary to constantly update the reasonable and customary charges for each line item over time. Moreover, in addition to the problem of a lack of standard nomenclature for such line items, there is a lack of standards in terms of quantifying line items. For example, one care provider may price a line item in metric quantities whereas another care provider may use U.S. standards. In another example, one care provider may price a line item in twenty minute increments whereas another care provider may price a line item in thirty minute increments.

The difficulty in establishing whether line items should have been charged and the difficulty in establishing fair pricing for such line items because of the lack of any uniformity in line item names or units of measure has led care providers and payers to pay insufficient attention, if any, to the line itemization associated with medical bills, and focus, instead, on revenue code charges on the UB. However, as noted above, revenue code charges are summaries of the numerous line item charges. Without satisfactory means for evaluating the underlying line itemization, payers are at risk for overpaying medical claims, or for denying such claims without convincing explanations for why such claims have been denied.

Given the above back-ground, what is needed in the art are improved, efficient methods for evaluating medical chargers so that providers can be compensated at fair prices in a relatively quick amount of time.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

FIGS. 6A and 6B illustrate field codes found in a UB-04 form, according to the prior art.

FIG. 7 illustrates a user interface for the identification of a generic name and generic description for each line item associated with a generic description lookup table in accordance with an embodiment of the present disclosure.

FIG. 10 illustrates how all the child line item descriptions for a given generic item description are displayed when requested by a user in accordance with some embodiments of the present disclosure.

FIG. 11 illustrates a panel in which line items associated with a generic parent descriptor are displayed together with pricing information, in accordance with some embodiments of the present disclosure.

FIG. 12 illustrates a panel in which a reason for denying a line item card is associated with a line item, in accordance with some embodiments of the present disclosure.

DETAILED DESCRIPTION

Figure 1:
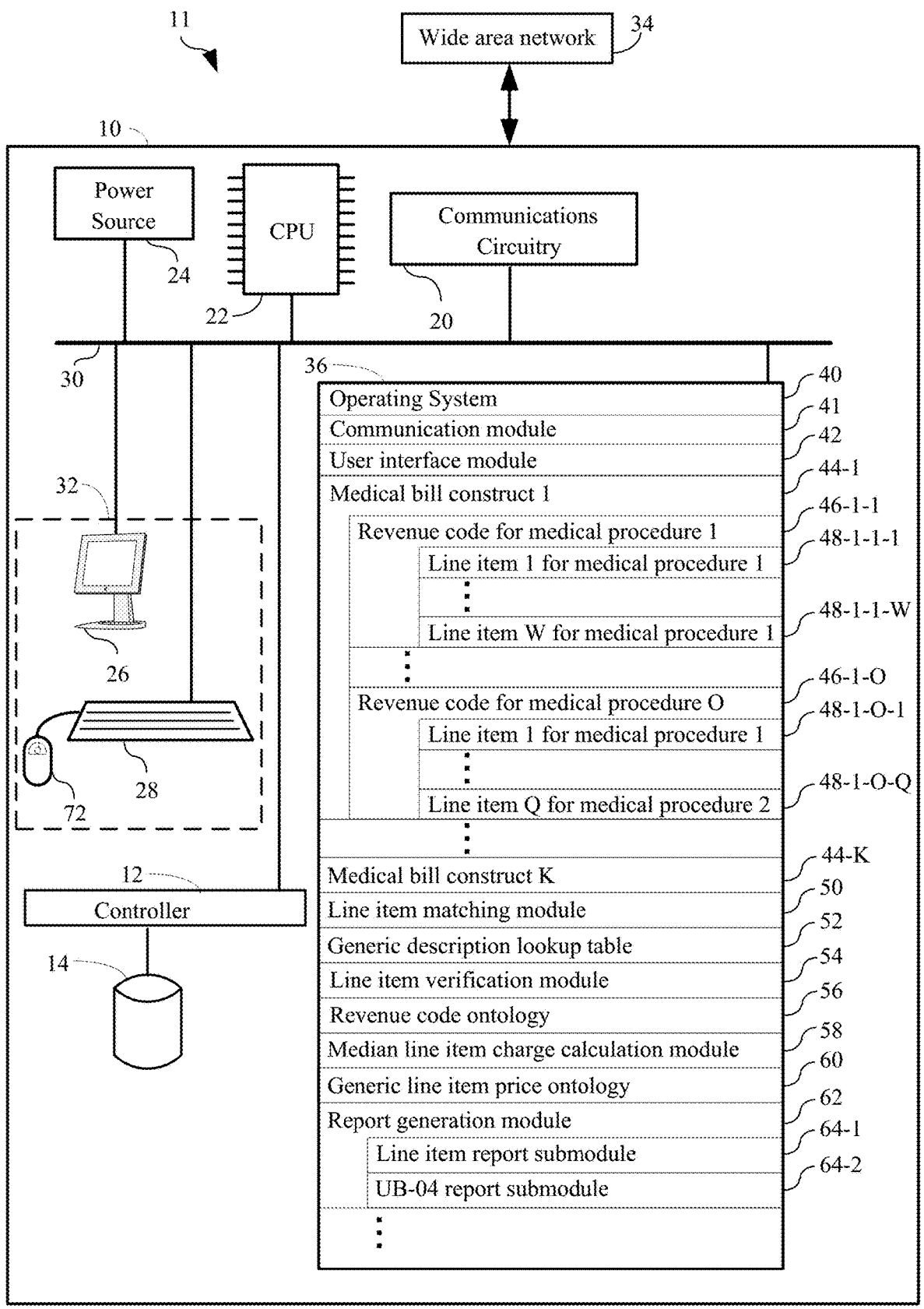
FIG. 1 is a block diagram illustrating a network system, according to some embodiments for evaluating medical procedures.

The embodiments described herein provide techniques for evaluating a medical procedure. In particular, the embodiments herein provide techniques for evaluating the pricing of such medical procedures. FIG. 1 is a block diagram illustrating a computer system 11, comprising a computer 10, in accordance with one such embodiment. The computer 10 typically includes one or more processing units (CPU's, sometimes called processors) 22 for executing programs (e.g., programs stored in memory 36), one or more network or other communications interfaces 20, memory 36, a user interface 32, which includes one or more input devices (such as a keyboard 28, mouse 72, touch screen, keypads, etc.) and one or more output devices such as a display device 26, and one or more communication buses 30 for interconnecting these components. The communication buses 30 may include circuitry (sometimes called a chipset) that interconnects and controls communications between system components.

Memory 36 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 36 optionally includes one or more storage devices remotely located from the CPU(s) 22. Memory 36, or alternately the non-volatile memory device(s) within memory 36, comprises a non-transitory computer readable storage medium. In some embodiments, memory 36 or the computer readable storage medium of memory 36 stores the following programs, modules and data structures, or a subset thereof:

- an operating system 40 that includes procedures for handling various basic system services and for performing hardware dependent tasks;
- an optional communication module 741 that is used for connecting the computer 10 to other computers via the one or more communication interfaces 20 (wired or wireless) and one or more communication networks 34, such as the Internet, other wide area networks, local area networks, metropolitan area networks, and so on;
- an optional user interface module 42 that receives commands from a user via the input devices 28, 72, etc. and generates user interface objects in the display device 26 and/or communicates them to remote devices vial the wide area network 34;
- one or more medical bill constructs 44 from service providers that have been or need to be evaluated, typically in the form of a UB-04 compliant image and/or UB-04 compliant electronic file; each respective medical bill construct comprising, inter alia, revenue codes 46 and associated line items 48 for each respective line item;
- a line item matching module 50 for matching line item descriptions 48 from service providers with generic descriptions;
- a generic description lookup table 52 that is used by the line item matching module 50 to identity matches between line items 48 in medical bill constructs 44 with generic line items descriptions;
- a line item verification module 54 that determines whether line items 48 are validly associated with corresponding revenue codes 46;
- a revenue code ontology 56 that provides, for each of a plurality of revenue codes 46, a list of validly associated generic line items that is used by the line item verification module 54 to determine whether line items 48 are validly associated with corresponding revenue codes 46;
- a median line item charge calculation module 58 that determines a current median line item charge for a line item 48 based upon service providers in a select geographic area;
- a generic line item price ontology 60 that tracks the average price charged for each of a plurality of line items 48 by each of a plurality of service providers that is used by the median line item charge calculation module 58 to determine a current median line item charge for line items; and
- a report generation module 62 for reporting out an evaluation of a medical procedure, for instance as a line item report, using the line item report submodule 64-1, or a rolled up UB-04 report, using the UB-04 report submodule 64-2.

In some embodiments, the programs or modules identified above correspond to sets of instructions for performing a function described above. The sets of instructions can be executed by one or more processors (e.g., the CPUs 22). The above identified modules or programs (e.g., sets of instructions) need not be implemented as separate software programs, procedures or modules, and thus various subsets of these programs or modules may be combined or otherwise re-arranged in various embodiments. In some embodiments, memory 36 stores a subset of the modules and data structures identified above. Furthermore, memory 36 may store additional modules and data structures not described above.

Although FIG. 1 shows a "computer 10," FIG. 1 is intended more as functional description of the various features which may be present in a system than as a structural schematic of the embodiments described herein. In practice, and as recognized by those of ordinary skill in the art, items shown separately could be combined and some items could be separated. For example, the programs and modules depicted in FIG. 1 in a single computer could be implemented by one or more computers. The actual number of computers used to implement the disclosed features and how these features are allocated among them will vary from one implementation to another, and may depend in part on the amount of data traffic that the system must handle during peak usage periods as well as during average usage periods.

Figure 5:
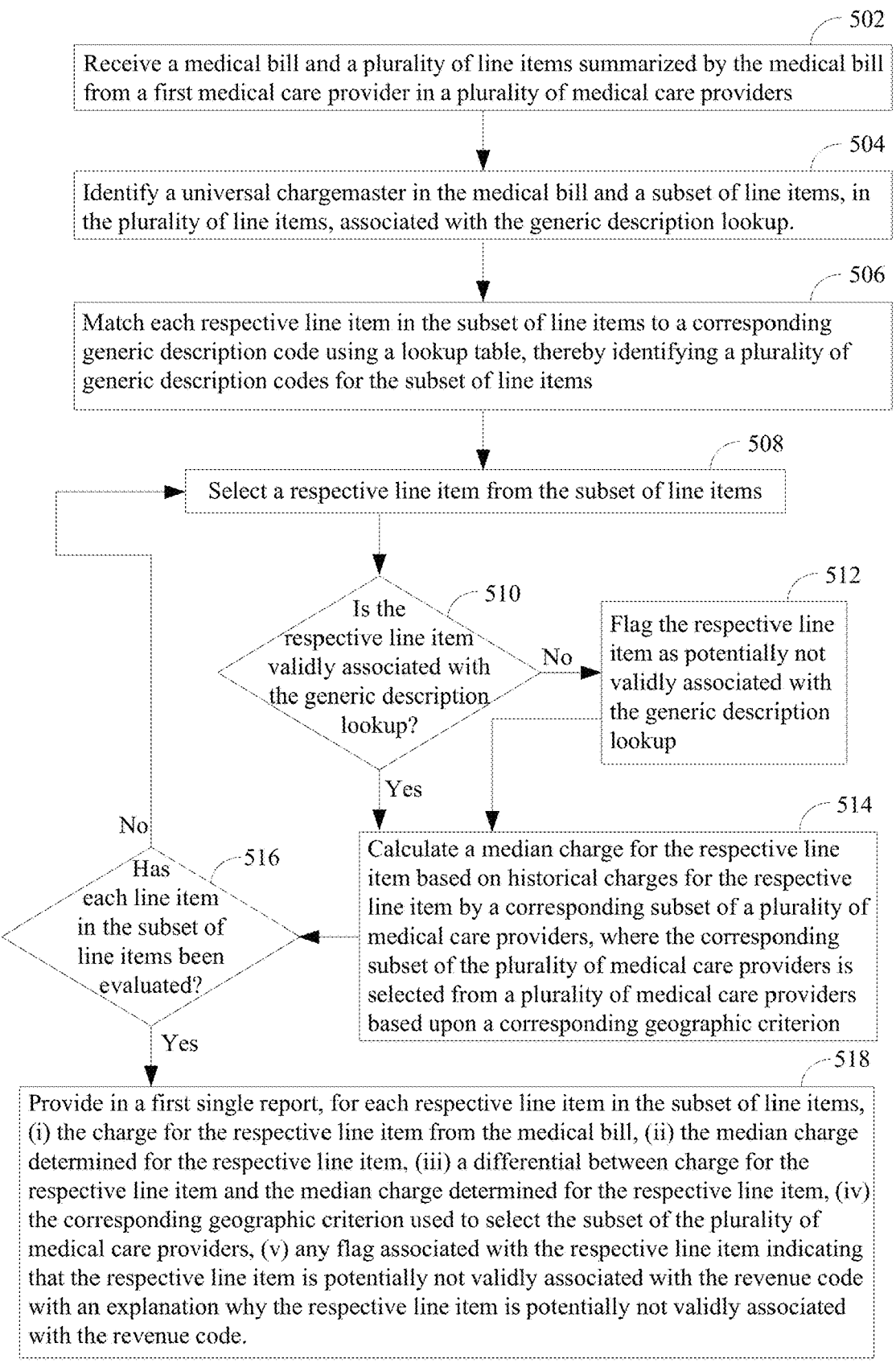
FIG. 5 illustrates a method for evaluating a medical procedure, according to some embodiments.

Now that a computer system in accordance with the present disclosure has been described, attention turns to FIG. 5, which provides a method in accordance with the present disclosure.

In step 502 of FIG. 5, a medical bill 44 is received from a medical care provider. Also received is a plurality of line items summarized by the medical bill. In some embodiments, the medical bill is a paper or electronic image of the medical bill that is provided by the medical provider. In some embodiments, the bill in is UB-04 format. In some embodiments, the medical provider is a hospital, doctor, emergency medical service, clinic, or other medical care provider. In some embodiments the medical bill is received by an insurer.

In step 504, a revenue code 46 in the medical bill 44 is identified and a subset of line items associated with the revenue code is also identified. A medical bill 44 can have any number of revenue codes 46. In some embodiments, the medical bill 44 has only one revenue code 46. In some embodiments, the medical bill 44 has two or more revenue codes 46, three or more revenue codes 46, or five or more revenue codes 46. In step 504, one of these revenue codes are identified. Moreover, the line itemization that was provided with the medical bill 44 is analyzed to identify the subset of line items 48 that are associated with the revenue code 46 under study. A line item 48 is associated with a revenue code 46 when the line item charge of the line item 48 contributes to the revenue code charge for the revenue code 46. For instance, consider the case where the revenue code is 0301 chemistry and that the charge for 0301 chemistry is $300.00. The line items 48 in the line itemization that contribute to this charge of $300.00 are the line items 48 associated with the revenue code. For example, the $300.00 charge under the 301 revenue code on the medical bill may be for three separate laboratory procedures, each of which costs $100.00. Thus, in this example, step 504 is directed to identifying the line items that contribute to the $300.00 charge for the 0301 chemistry revenue code.

As discussed above, the act of identification of the line items 48 for a given revenue code 46 is insufficient to evaluate the medical procedure associated with the revenue code because there is no standards that regulate line item nomenclature and line items metrics (e.g., quantities, units of time, etc.). Thus, in step 506, each respective line item in the subset of line items identified in step 504 is matched to a corresponding generic description code using a lookup table, thereby identifying a plurality of generic description codes for the subset of line items. Panel 700 of FIG. 7 illustrates the result of step 506 in accordance with one embodiment. Each row in panel 700 represents a line item 48 associated with a revenue code 46. Column 702 provides a generic line item name for each such line item, column 704 provides a description of each such line item, and column 706 provides the quantity of each such line item in the medical bill.

Figure 2:
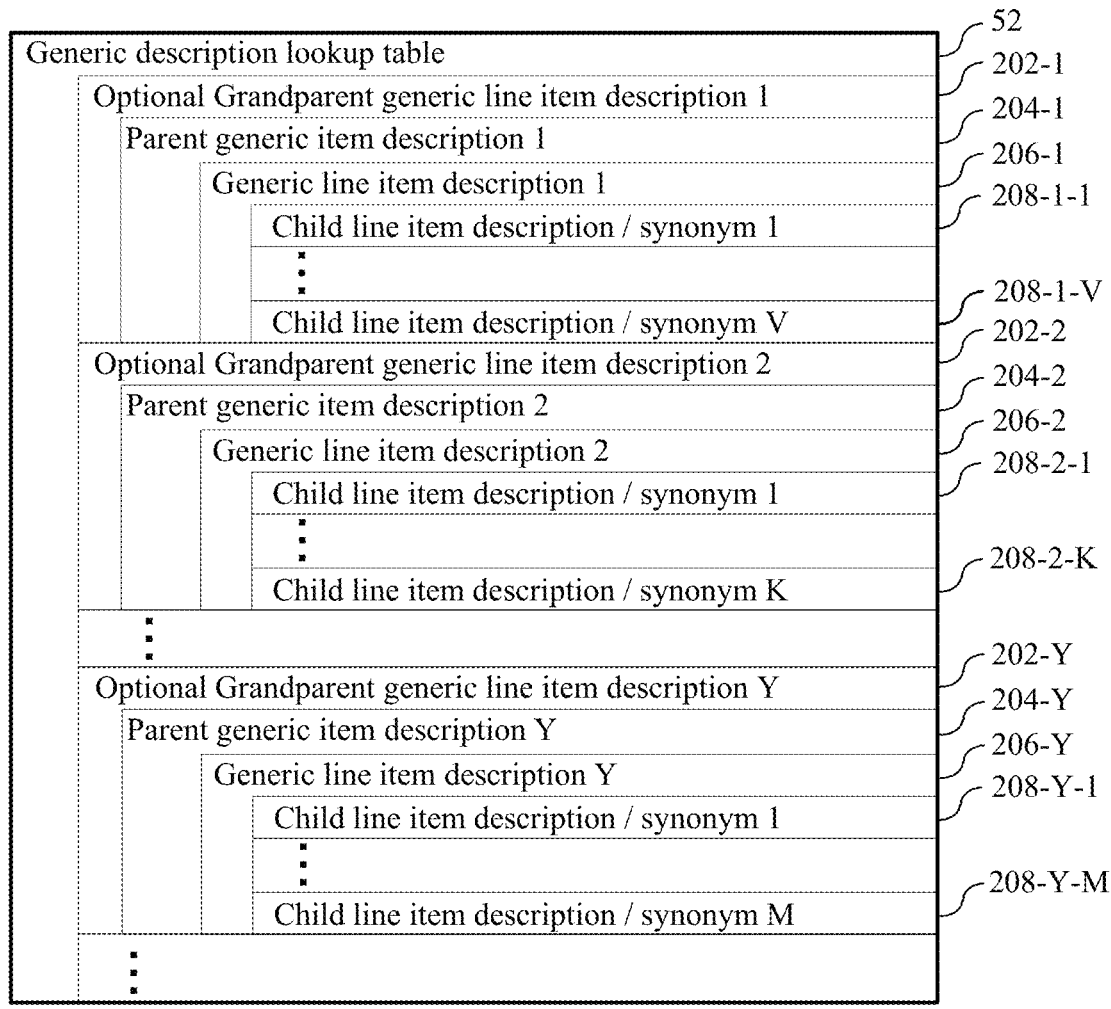
FIG. 2 illustrates a universal chargemaster generic description lookup table, according to some embodiments.

In some embodiments, step 506 is performed by line item matching module 50 (FIG. 1). In some embodiments, step 506 is performed using a generic description lookup table 52. FIG. 2 illustrates an example of a generic description lookup table 52. Although generic description lookup table 52 is described and illustrated as a table, this is for the convenience of understanding. Those of skill in the art will appreciate that the table 52 may be encoded in any number of different types of data structures.

Generic description lookup table 52 includes child line item descriptions/synonyms 208 for each generic item description 204. Each unique child line item descriptions/synonyms 208 originated from a line item 48 from a medical bill from any one of a plurality of medical providers. Child line item descriptions/synonyms 208 that are for the same thing (medical device, equipments, supply or procedure) are associated with the generic line item description 206 for the thing. As illustrated in FIG. 7, in some embodiments, the generic line item description 206 comprises a generic name 702 and a description 704.

In some embodiments, in addition to the generic line item description 206, there is a parent generic description 204 in generic description lookup table 52. In such embodiments, the parent generic description 204 (parent synonym) is a classification of the child synonym. In some embodiments, there is a grandparent-parent relationship between the parent synonym 204 and a grandparent generic line item description 202 (grandparent synonym) for the respective generic description. As will be provided in further detail below, the grandparent synonym 202 provides a mechanism for comparing a charge associated with the child line item description 208 to charges made by providers other than the first medical care provider for the medical service or item associated with the respective generic line item description 206. To illustrate, consider the case in which the child line item description 208 is "Surgery Level 4 181-240 (Min)" and, based on generic description lookup table 52, line item matching module 50 makes the determination that this corresponds to the generic line item description 204 of "OR/OPER/RM/SURG/PRNT". From generic description lookup table 52, the determination is made that the parent generic item description 204 for the generic line item description "OR/OPER/RM/SURG/PRNT" is "OPERATING ROOM TIME PER MIN", and that the grandparent generic line item description for this is "OPERATING ROOM TIME PER MIN". In this example, the parent generic item description 204 provides the class of the underlying generic line item description 206, operating room in time per minute, whereas the grandparent generic line item description provides the lowest common denominator between all the child line item descriptions 208 associated with the parent generic item description 204.

Figure 8:
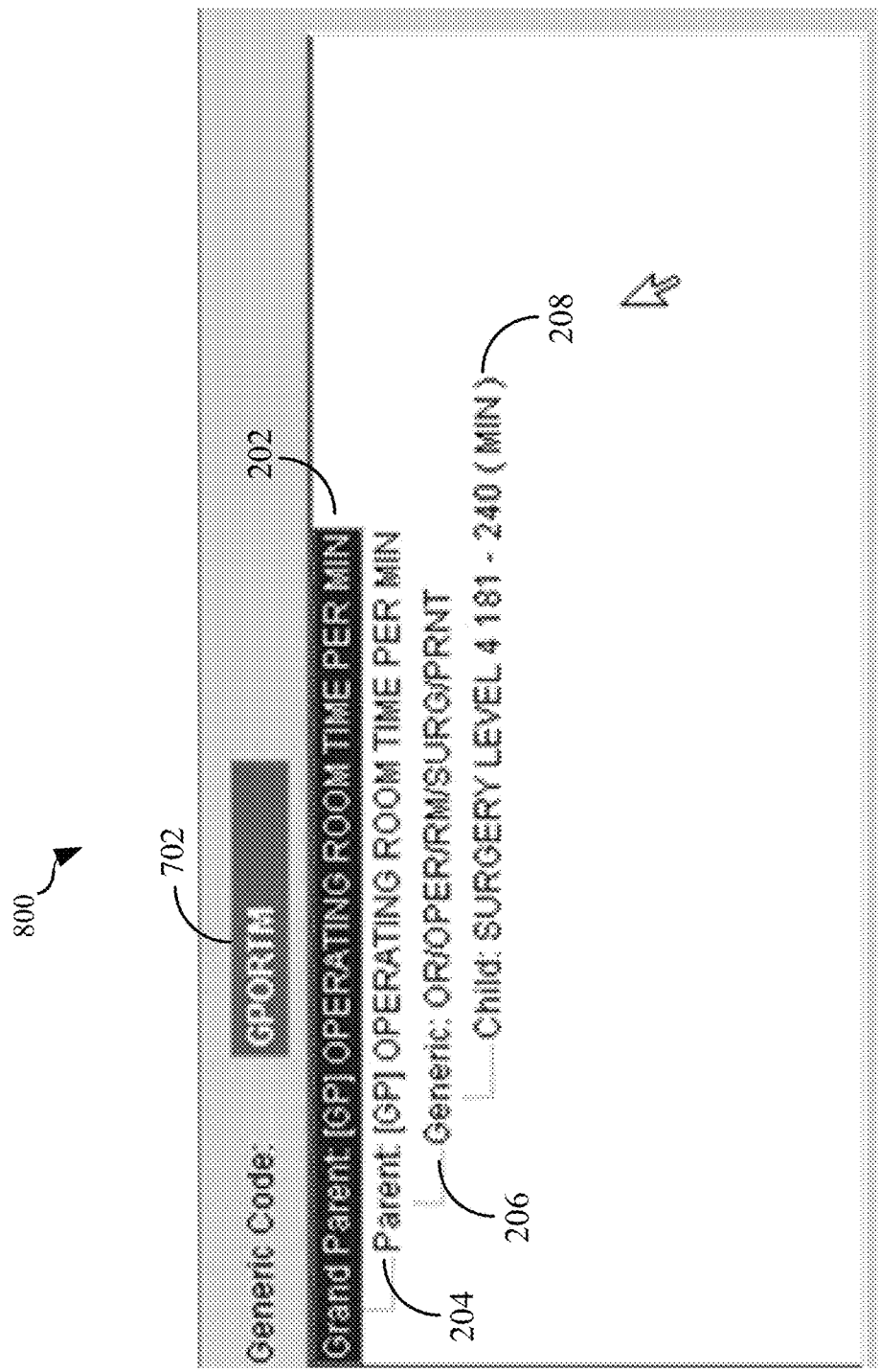
FIG. 8 illustrates how each line item in a medical bill is associated with a generic item description, parent generic item description and, optionally, a grandparent generic line item description in accordance with some embodiments of the present disclosure.

Panel 800 of FIG. 8 illustrates this hierarchical relationship. For generic code 702 there is a grandparent generic line item description 202 that provides a basis for equating a plurality of associated child line item descriptions 208. Further, there is a parent generic description 204 that provides a class for a generic line item description 206. Finally, there is the child line item description 208 that has been identified in the line itemization for a revenue code 46 in a medical bill 44.

In some embodiments, step 506 is performed, at least initially, by line item matching module 50 without human intervention. Accordingly, some aspects of the present disclosure provide a computer-implemented method in which the matching of a line item 48/208 in a subset of line items associated with a revenue code 46 to a corresponding generic description code 206 using a lookup table (e.g., generic description lookup table 52) is performed without human intervention. Furthermore, in some such embodiments, the method further comprises providing in a single report a degree of confidence that a line item 48/208 in the subset of line items has been correctly matched to a corresponding generic description code 206 in the lookup table. For instance, referring to FIG. 7, where each row provides a prediction of the generic description code 206 for a corresponding line item 48 in a subset of line items associated with a revenue code 46, the rows are color coded based on a degree of confidence that the correct match between the line item 48 and the generic description code 206. For instance, in some embodiments, a white row means that there is a 100 percent match between the line item description and the generic description code description. Green rows are likely matches, blue rows respectively represent less likely matches and red rows mean that a match was not found. Such color coding, or other use of indicia to represent confidence in the matching allows a worker to quickly review the matching and make any manual adjustments that are necessary. In some embodiments, in addition to making manual adjustments, the generic description lookup table 52 is updated. For instance, a new child line description 208 may be equated to an existing parent generic item description 204. In another instance, wild cards characters may be imposed into an existing child line description 208. In still another instance, the description of an existing child line description 208 or the generic item description 204 is modified. In still another instance, a child line description 208 is removed from a generic item description 204. In still another instance, a generic item description 204 is added to or removed from the generic description table. In still another instance, a grandparent generic line item description 202 and/or a parent generic item description 204 is modified, added to, or removed from the generic description lookup table.

Figure 9:
FIG. 9 illustrates how a generic item description can be selected for further evaluation in accordance with some embodiments of the present disclosure.
Figure 10:
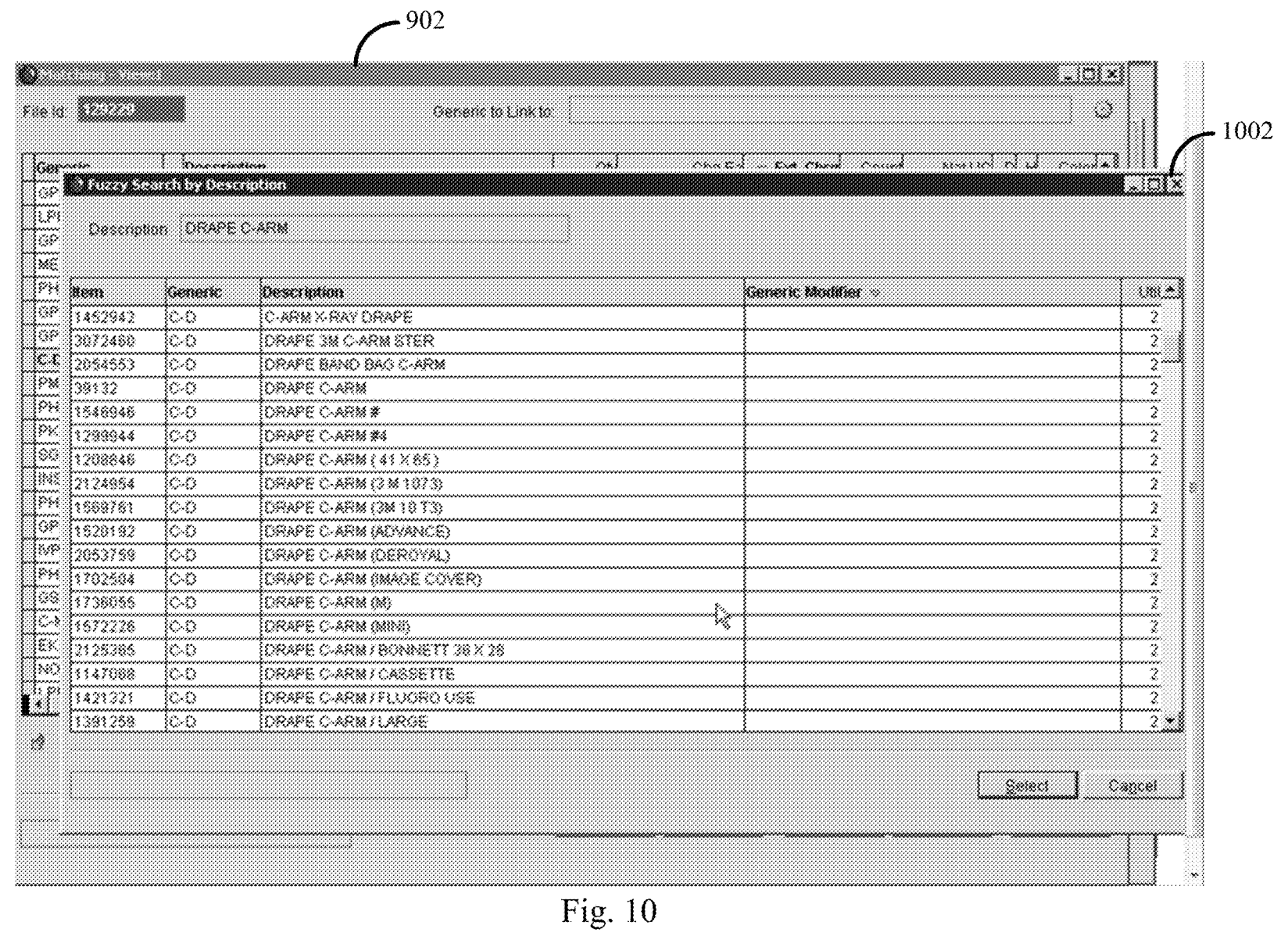

Advantageously, in some embodiments, a user can click or otherwise select a row in the panel showing the assigned generic item descriptions 204 for a subset of line items associated with a revenue code (e.g., panel 700) to see the possible alternative line item descriptions for the generic item descriptions 204. Thus, by clicking on a row in panel 700, all the child items 208 in the generic description lookup table 52 that are associated with the clicked on generic line item description 206 are displayed. FIGS. 9 and 10 illustrate. In FIG. 9, the generic item description 204 "DRAPE C-ARM" in panel 902 is color coded, indicating that the degree of confidence in the assignment of the generic item description 204 "DRAPE C-ARM" to the underlying child line item description 48/208 is less than 100 percent. By clicking on the DRAPE C-ARM row, a new panel, panel 1002 illustrated in FIG. 10 is displayed, which shows all the child line items 208 associated with the generic line item description 204 in the generic description lookup table 52. The user can then easily determine whether there is a better match.

Upon completion of step 506 each of the line items 48 associated with a medical bill construct 44 have been matched to generic line item descriptions 206. As disclosed above, the present disclosure provides several mechanisms for facilitating this process. First, there is a comprehensive generic description lookup table that provides the available synonyms for each generic line item descriptions. These synonyms represent the multitude of different ways various care provides name the same medical item. By using computer implemented automated matching algorithms, the particular line items in a given medical bill are matched to a synonym (child line description) in the generic description lookup table 52, without human intervention, to thereby propose an assignment of line items to generic item descriptions. Moreover, in some embodiments, such automated assignments are each individually assigned a degree of confidence based on match quality. This is advantageous because it allows for skilled workers, such as nurses, to quickly review the matches and determine whether any manual matching is necessary, for instance using the tools illustrated in FIGS. 9 and 10.

Once the line items have been matched to generic item descriptions, it is possible to perform comprehensive evaluations. The present disclosure relies on the matching of line items associated with a revenue codes to generic item descriptions to (i) ascertain whether such line items validly belong with the line item descriptions, and (ii) ascertain whether the price for each line item is within a permissible range. Loop 508-516 provides one such process in which this is accomplished. For each iteration of loop 508-516, one line item is evaluated for validity and for pricing. This loop is provided for ease of understanding, it will be appreciated that other orderings of the processing steps are possible. For instance, each line item associated with a revenue code can be checked for validity before checking the pricing of any of the line items. Moreover, the process illustrated in FIG. 5 operates on the line items of a single revenue code when, in fact, the medical construct may include numerous revenue codes. One of skill in the art will appreciate that the method illustrated in FIG. 5 may easily be extended to evaluation of the line items of all the revenue codes in one or a plurality of medical constructs (bills).

In step 508 a first respective line item 48 from the subset of line items associated with a revenue code 46 is selected. This line item 48 has previously been associated with a generic line item description 206 in the generic description lookup table 52.

In step 510, a determination is made as to whether the respective line item 48 is validly associated with the revenue code 46 to which it was assigned in the incoming medical bill construct 44. In some embodiments, such verification is performed without human intervention using line item verification module 54. In some embodiments, such verification is done initially without human intervention using line item verification module 54 but then is reviewed by a skilled practitioner such as a trained nurse.

Figure 3:
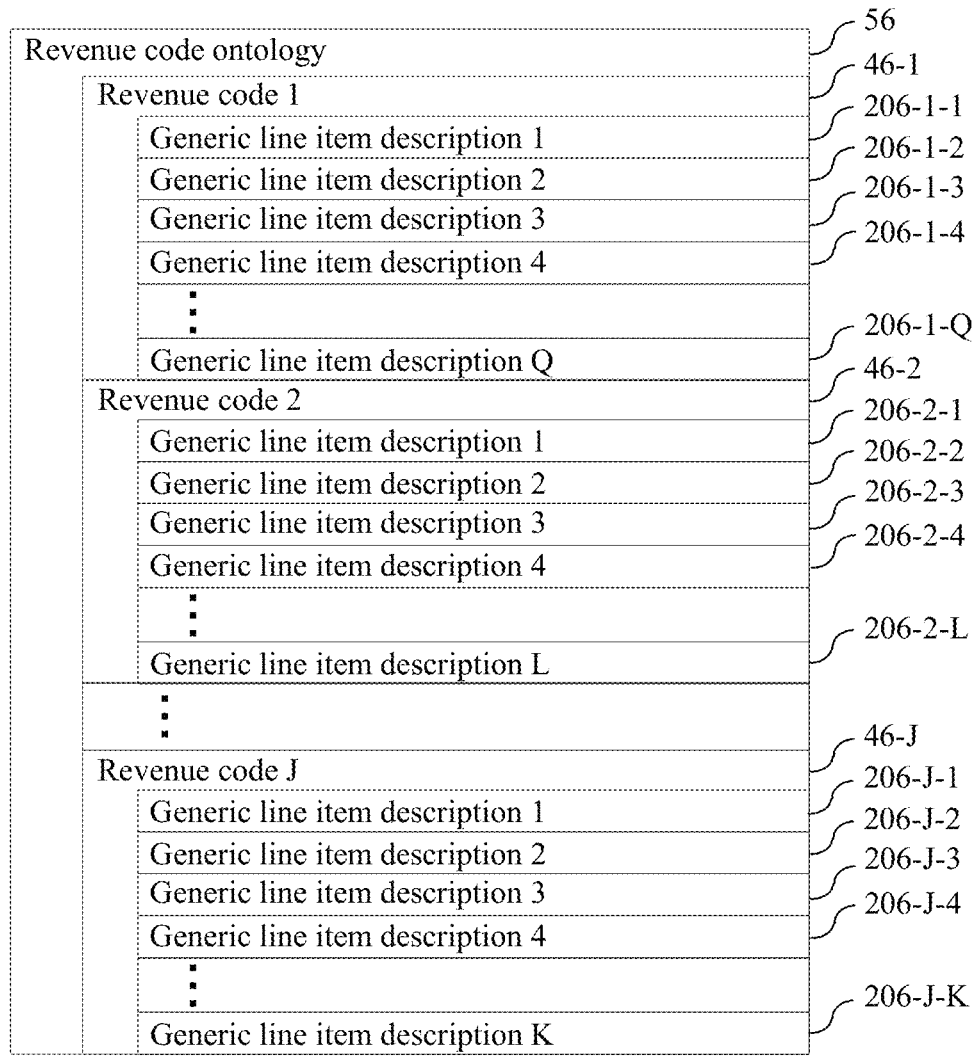
FIG. 3 illustrates a revenue code ontology, according to some embodiments.

In some embodiments, the line item verification module 54 verifies a line item 48 using a revenue code ontology 56. FIG. 3 illustrates an exemplary revenue code ontology 56. For each possible revenue code 46, there is a plurality of validly associated generic line item descriptions 206. In some embodiments, a line item 48 is deemed to be validly associated with a revenue code 46 (510—Yes) when the generic line item description 206 that was matched to the line item 48 in step 506 is associated with the revenue code in the revenue code ontology 56. For example, if the generic line item description 206 for line item 48 is "Oxygen 2

Liters", and "Oxygen 2 Liters" is listed in the revenue code ontology 56 as a generic line item description 206 for the revenue code 46 associated with the subject instance of "Oxygen 2 Liters" on the medical bill construct 44, the line item 48 will be deemed to be validly associated with the revenue code 46. In this instance, process control will pass directly to step 514.

Figure 11:
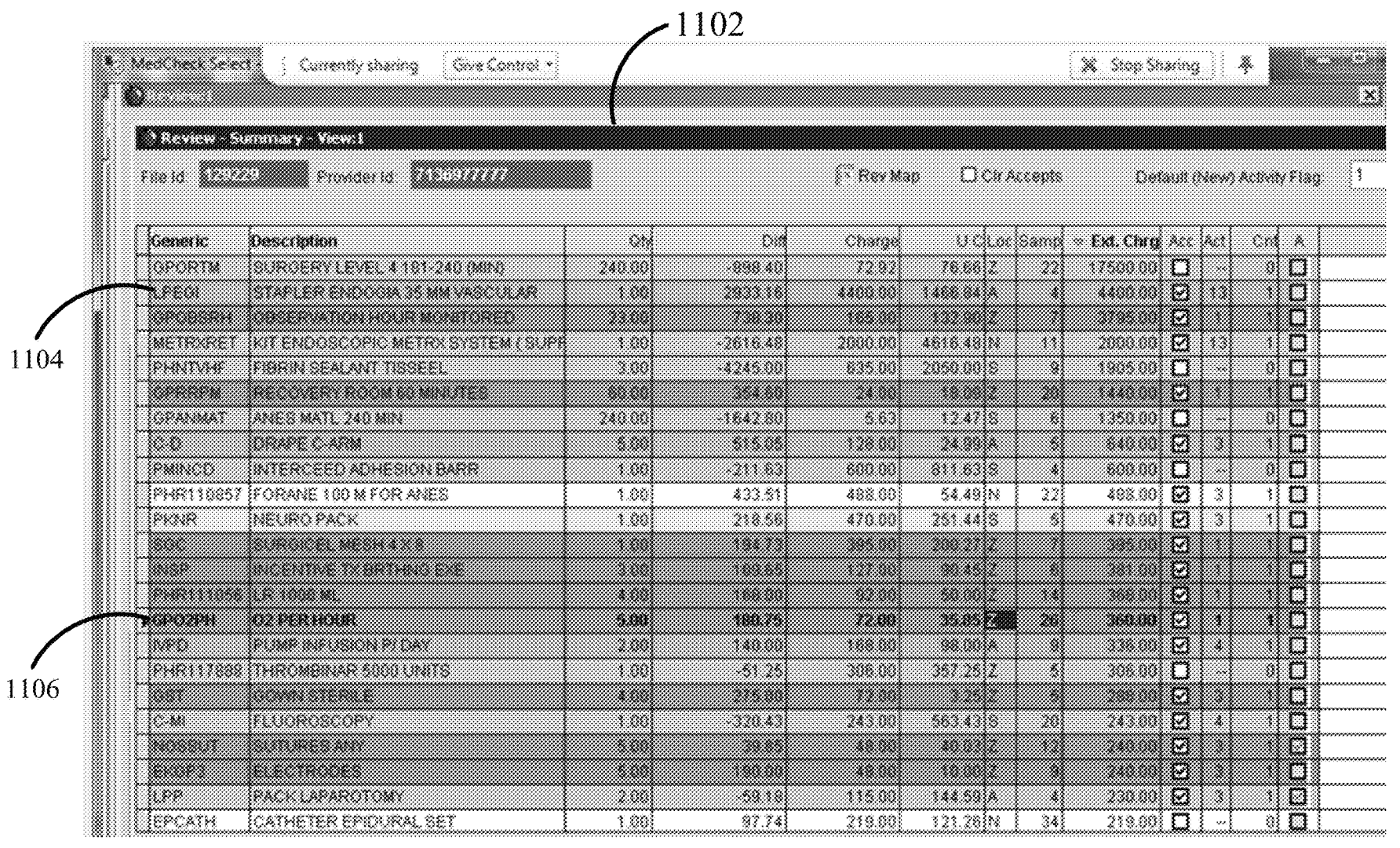
Figure 12:
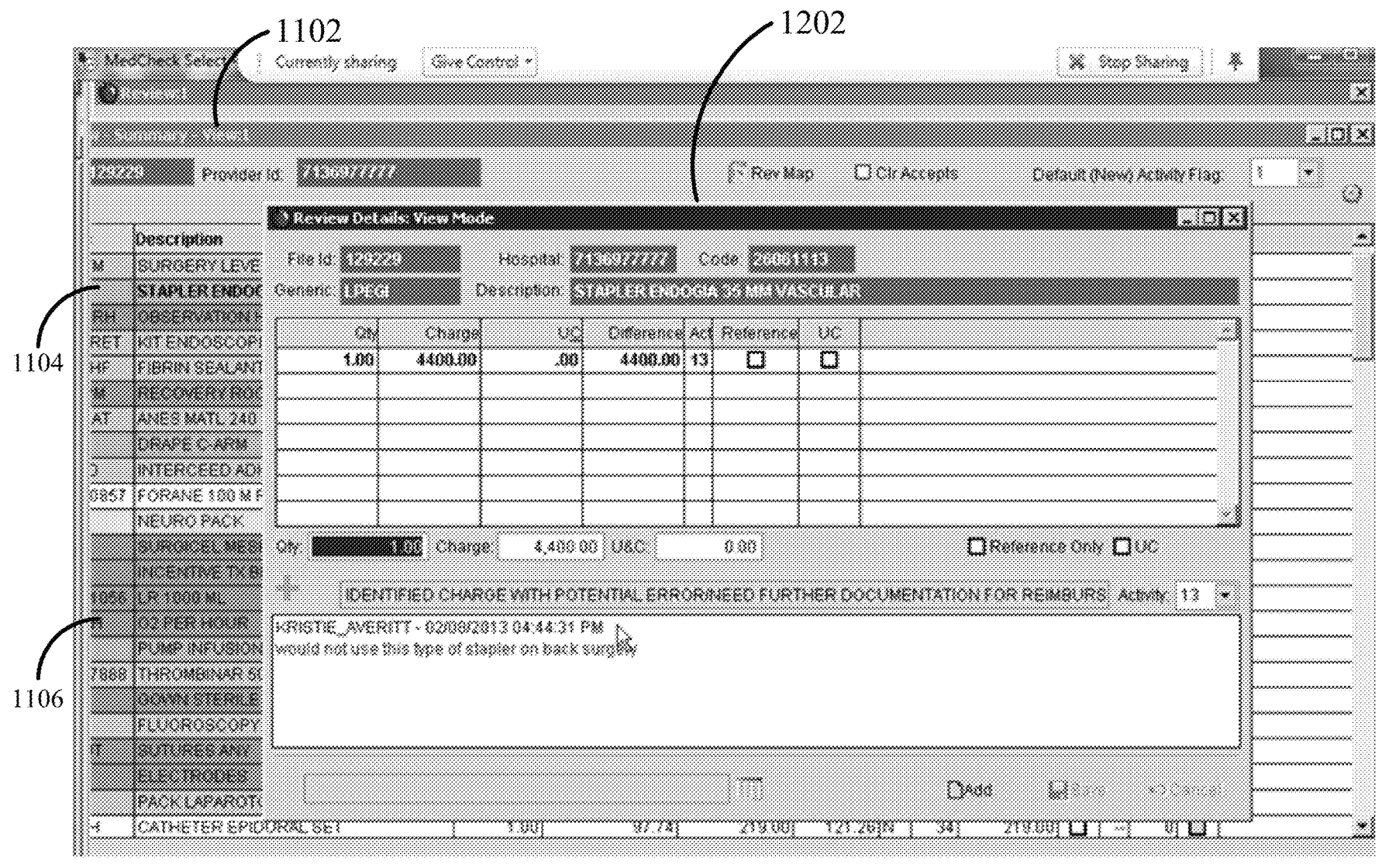

On the other hand, in some embodiments, a line item 48 is deemed to not be validly associated with a revenue code 46 (510—No) when the generic line item description 206 that was matched to the line item 48 in step 506 is not associated with the revenue code in the revenue code ontology 56. In this instance, process control will pass to step 512. In step 512 the respective line item is flagged as potentially not validly associated with the revenue code. FIGS. 11 and 12 illustrate. In panel 1102 of FIG. 11, each row represents a line item associated with a revenue code for back surgery in a medical bill being evaluated. One of these line items is indicated by element 1104, "Stapler Endogia 35 MM Vascular". This type of stapler is not used for that type of back surgery. The stapler is for endoscopic surgery and it's also for the gastrointestinal system, which is your stomach and intestines. Advantageously, the medical bill processor can use the interface provided by panel 1102 to select this line item, thereby bringing up panel 1202 of FIG. 12, and add a flag to the line item, rejecting the line item and providing a reason for the rejection. Alternatively, in some embodiments, the revenue code ontology 56 is used to reject such a line item on the basis that the line item is not associated with the back surgery revenue code. In some embodiments, a hybrid of automated and manual review is performed, with the automated portion of the system highlighting line items that are not associated with the revenue codes, specified on the medical bill, in the revenue code ontology and a trained reviewer, such as a nurse, reviewing panels such as panel 1102 as a final check and to add comments for why certain line items are rejected.

Figure 13:
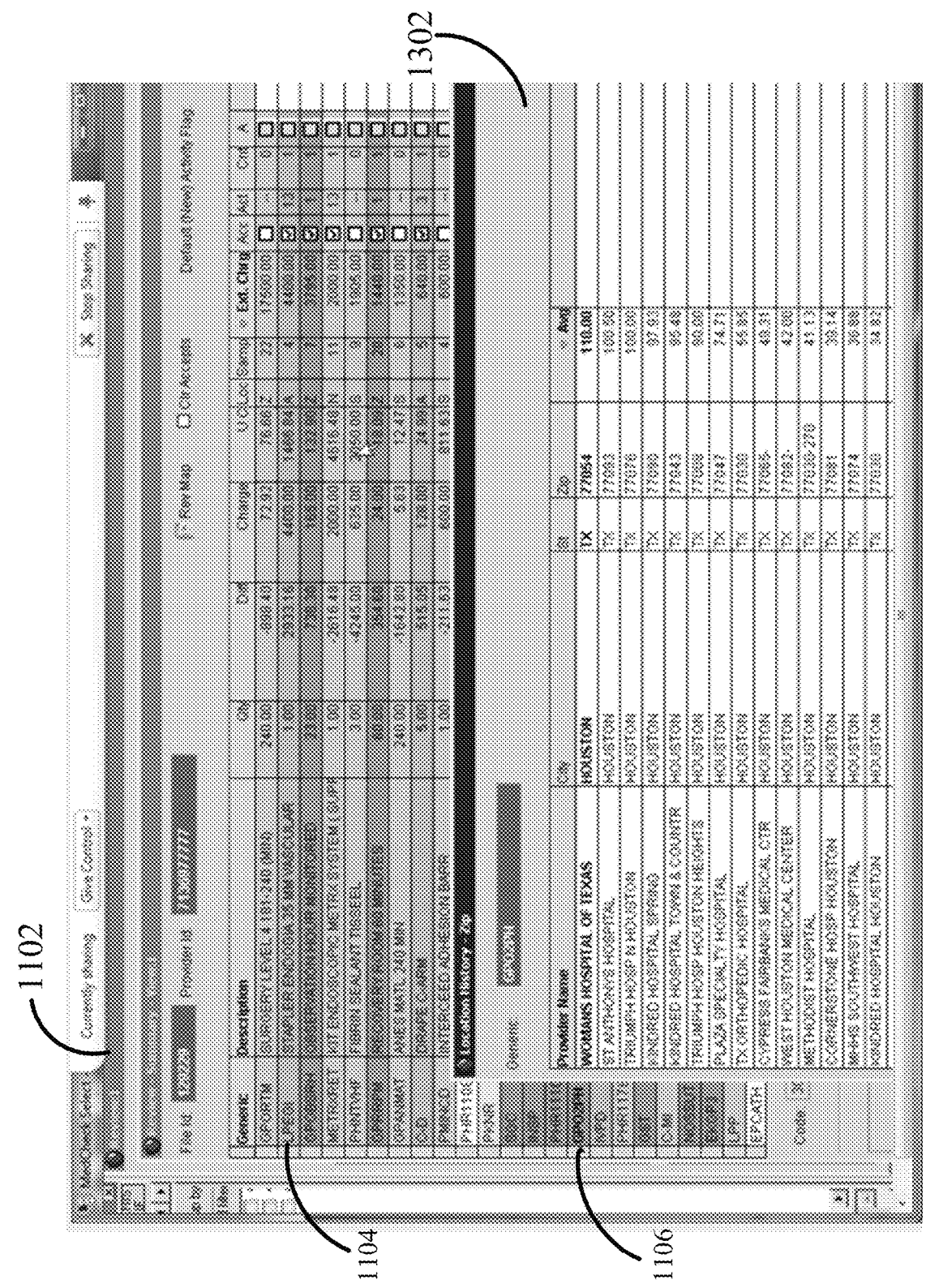
FIG. 13 illustrates a panel that shows which care providers are used to form the basis of a reasonable and customary charge an itemization line item, together with the average charge such care providers charge for the line item, in accordance with some embodiments of the present disclosure.

As illustrated in FIG. 5, upon the completion of step 512 or after state 510—Yes is reached, process control passes to step 514. In step 514, a median charge for the line item is calculated based on historical charges for the respective line item by a corresponding subset of a plurality of medical care providers. This corresponding subset of the plurality of medical care providers is selected from a plurality of medical care providers based upon a corresponding geographic criterion. FIGS. 11 and 13 illustrate. As described above, panel 1102 provides the line items associated with a particular revenue code in a medical bill. One of these line items is GPO2PH, 02 Per hour 1106. In other words, oxygen per hour. Further disclosed for line item 1106 in panel 1102 is the quantity (Qty, five), the total amount the line item exceeds reasonable and customary charges (Diff, $180.75), the actual charge on the medical bill per hour ($72.00), the reasonable and customary charge ($35.85 per hour), and the total charge for the line item on the medical bill ($360). The field "reasonable and customary charge" (denoted U C in panel 1102) is highly advantageous because it provides the medical bill evaluator with some context for what others are charging for the same line item. Further disclosed on FIG. 11 for the line item 1106 is a value in the column termed "Loc", which stands for the geographical basis used to calculate the reasonable and customary charge. In the case of this line item, the code given is "Z" which stands for the first three digits of a zip code. Thus, in order to calculate the reasonable and customary charge for oxygen per hour for this medical bill, those care providers in the same zip code as the care provider that submitted the instant medical bill under evaluation are considered. Referring to FIG. 13, the medical reviewer can quickly check to see the identity of the care providers that were used to calculate the reasonable and customary charge for the GPO2PH line item. In panel 1302 each of the care providers in the vicinity of the care provider that provided the medical bill being evaluated and that have invoiced the same line item within a threshold time period is provided together with the average price that each such medical bill provider charged for the line item. For instance, consider the case where the qualifying time period is a rolling 24 month window (the past 24 months), then each time a given care provider within the requisite geographic zone charged for the same line items is factored into the average price that care provider charges for that line item. So, for example, if a given care provider invoiced this item three times in the past 24 months at respective prices $105, $110, and $115, the average price for that care provider will be represented at $110. To compute the reasonable and customary charge, the median of the average price charged by each care provider is computed.

Figure 4:
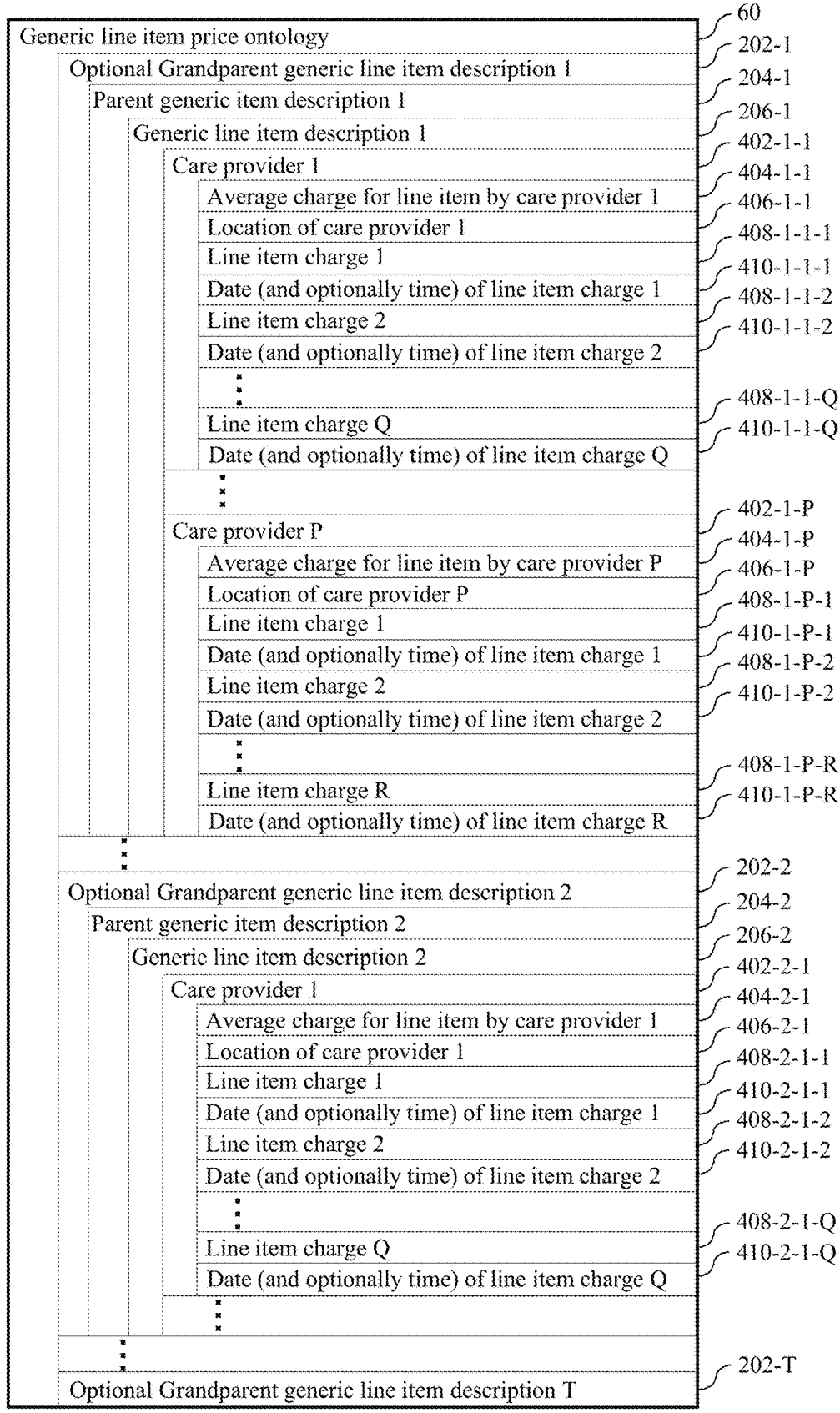
FIG. 4 illustrates a generic line item price ontology, according to some embodiments.

Referring to FIG. 1, in some embodiments the median charge for a line item is computed by generic line item charge calculation module 58. In some embodiments, the disclosed systems and methods further make use a generic item price ontology 60. FIG. 4 illustrates a generic item price ontology 60 in accordance with some embodiments of the present disclosure. For each grandparent generic line item description 202 (when present) or, alternatively, parent generic line item description 204/line item description 206, there is provided a list of care providers 402 that have invoiced that generic line item description on an invoice during a qualifying period of time. For each such respective care provider 402, there is further provided the average charge 404 for the line item charged by the respective care provider 402 (or some other measure of central tendency of the charge for the line item charged by the respective care provider 402), the location 406 of the care provider. In some embodiments, rather than or in addition to providing the average charge for the line item by the care provider, the generic line item price ontology 60 provides each respective actual line item charge 408 and the corresponding date 410 of the respective actual line item charge 408 so that the computation of the average (or other measure of central tendency) can be computed on a dynamic basis (e.g., to accommodate rolling qualifying time periods and or different time periods for accepting charges for the computation of the average price).

Those of skill in the art will appreciate that the computation of the reasonable and customary charge can be computed in a variety of ways given the instant disclosure and all such ways are within the scope of the instant invention. For example, the geographic region used to compute the reasonable and customary charge can be adjusted. For instance, referring to panel 1102 in FIG. 11, "A" is termed "Area" and is defined as the first two digits of the postal zip code, "Zip" represents the first three digits of the postal zip code, "S" represents a state, and "N" represents national. Furthermore, in some embodiments the rows can be color coded based on the geographic region used to compute the usual and customer charge. For instance, white could represent national, yellow could represent state, green could represent zip code, and blue could represent area. While the geographical region that is used to compute the reasonable and customary charge preferably encompasses the area where the care provider that generated the bill under review performed the services, the extent of the area used to compute the reasonable and customary charge is determined on an automated basis in some embodiments. For example, in some embodiments, a line item is rarely used or charged by care providers and thus a national area is necessary in order to compute a reliable reasonable and customary charge. In contrast, in some embodiments, a line item is quite common and thus all that is needed is a small geographic area in the vicinity of the care provider that submitted the medical bill under evaluation in order to ascertain a reliable reasonable and customary charge.

Advantageously, the disclosed systems and methods can compute reasonable and customary charges based on any applicable policies imposed by the payer of the medical bill. Thus, if the payer requires that reasonable and customary amounts be determined based on zip code, this is easily implemented.

The above-disclosed embodiments specified that an average line item charge is computed for each respective care provider in the qualifying geographic region based on charges these respective care providers made in a certain period of time. Those of skill in the art will appreciate that other measures of central tendency could be used instead, such as median, mode, geometric mean harmonic mean, weighted mean, truncated mean, midrange, mid hinge, tri-mean or Winsorized mean of the charges for each respective care provider in the qualifying geographic period of time during the qualifying period of time. Moreover, in some embodiments, line item charges are weighted by how recently they were made (e.g., on a logarithmic or otherwise basis).

Line item charges that are used to compute the average line item charge for a given care provider are taken from a predetermined period of time. In some embodiments, this predetermined period of time is within the past 6 months, within the past 12 months, within the past 24 months, within the past 36 months, or within the past 48 months. In a preferred embodiment the predetermined period of time is within the past 24 months.

The above-disclosed embodiments specified that the a median of the average line item charge from each respective care provider in the qualifying geographic region during the qualifying period of time is taken in order to compute the reasonable and customary charge for the line item. Those of skill in the art will appreciate that other measures of central tendency could be used instead, such as median, mode, geometric mean harmonic mean, weighted mean, truncated mean, midrange, mid hinge, tri-mean or Winsorized mean of the average line item charge from each respective care provider in the qualifying geographic region during the qualifying period of time.

The systems and methods are uniquely suited for computed reasonable and customary charges because great care has been taken to equate line items to generic descriptions in order to be sure that correct comparisons of line item charges from different care providers, or indeed even from different departments of a common care provider, are made. Moreover, through the use of parent and grandparent generic line item descriptions, it is possible to reduce line items to the lowest common denominator (e.g., oxygen per minute, surgery per minute) in order to make such comparisons. Moreover, as seen in panel 1102 in FIG. 1106, a qualified reviewer can easily compare the line item charges of the medical bill to see which line item prices are excessive. Advantageously, the reviewer can flag these line items, adjust them as a function of the reasonable and customary charge (e.g., to 80 percent of reasonable and customary, to 90 percent of reasonable and customary, to 100 percent of reasonable and customary). Moreover, for line items that have previously been identified as not validly associated with the revenue code, their prices can be adjusted to zero percent of reasonable and customary.

Returning to FIG. 5, in step 516 a determination is made as to whether each line item in the subset of line items has been evaluated. If not (516—No), process control returns to step 508 for selection of another line item to evaluate. If all the line items in the subset have been evaluated (516—Yes), process control passes to step 518.

In step 518, the system provides in a first single report, for each respective line item in the subset of line items, (i) the charge for the respective line item from the medical bill, (ii) the median charge determined for the respective line item, (iii) a differential between charge for the respective line item and the median charge determined for the respective line item, (iv) the corresponding geographic criterion used to select the subset of the plurality of medical care providers, (v) any flag associated with the respective line item indicating that the respective line item is potentially not validly associated with the revenue code with an explanation why the respective line item is potentially not validly associated with the revenue code. Panel 1102 of FIG. 11 illustrates such a report. For instance, referring to line item 1106, what is provided is (i) the charge for the respective line item from the medical bill ($72 times a quantity of 5), (ii) the median charge determined for the respective line item (reasonable and customary $35.85 times a quantity of 5), (iii) a differential between charge for the respective line item and the median charge determined for the respective line item ((72−35.85)×5=$180.75), (iv) the corresponding geographic criterion used to select the subset of the plurality of medical care providers ("Z", for zip code), (v) any flag associated with the respective line item indicating that the respective line item is potentially not validly associated with the revenue code with an explanation why the respective line item is potentially not validly associated with the revenue code. In the case of line item 1106 there is no such flag because the line item is validly associated with the revenue code.

The method illustrated in FIG. 5 may be governed by instructions that are stored in a computer readable storage medium and that are executed by at least one processor of at least one server. Each of the operations shown in FIG. 5 may correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components.

These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A computer-implemented method for evaluating medical billing, performed on a computer system having at least one processor and memory storing at least one program for execution by the at least one processor to perform the method, comprising:
   receiving a medical bill and a plurality of line items summarized by the medical bill from a first medical care provider in a plurality of medical care providers;
   identifying a revenue code in the medical bill and a subset of line items, in the plurality of line items, associated with the revenue code;
   matching each respective line item in the subset of line items associated with the revenue code to a corresponding generic description code using a lookup table, thereby identifying a plurality of generic description codes for the subset of line items, wherein
      the lookup table comprises a plurality of generic descriptions, each corresponding to a medical service or item,
      the lookup table further comprises one or more synonyms for at least one respective generic description, wherein the one or more synonyms are originated from line items of medical bills from the plurality of medical care providers, and
      for the at least one generic description in the plurality of generic descriptions, the matching comprises comparing a respective line item in the subset of line items associated with the revenue code to each of the one or more synonyms of the at least one generic description in the plurality of generic descriptions;
   using the plurality of generic description codes to determine whether each respective line item in the subset of line items is validly associated with the revenue code, wherein, when a respective line item in the subset of line items is deemed to not be validly associated with the revenue code, the line item is flagged as potentially not validly associated with the revenue code;
   calculating a median charge for each respective line item in the subset of line items based on historical charges for the respective line item by a corresponding subset of the plurality of medical care providers, wherein the corresponding subset of the plurality of medical care providers is selected from the plurality of medical care providers based upon a corresponding geographic criterion; and
   providing in a first single report information identifying one or more line items, in the subset of line items, that have been flagged as potentially not validly associated with the revenue code.

2. The computer-implemented method of claim 1, wherein the first single report comprises a separate row for each respective line item in the subset of line items color coded by the corresponding geographic criterion used to select the corresponding subset of the plurality of medical care providers when establishing the median charge for the respective line item.

3. The computer-implemented method of claim 2, wherein
   the first single report comprises a first row that details a first line item in the subset of line items in which a first geographic criterion was used to select the corresponding subset of the plurality of medical care providers used as the basis for establishing the median charge for the first line item, the first row being in a first color associated with the first geographic criterion; and
   the first single report comprises a second row that details a second line item in the subset of line items in which a second geographic criterion was used to select the corresponding subset of the plurality of medical care providers used as the basis for establishing the median charge for the second line item, the second row being in a second color associated with the second geographic criterion.

4. The computer-implemented method of claim 3, wherein the first geographical criterion is other than the second geographical criterion and the first and second geographical criterion are each independently selected from the group consisting of zip code, state, national, and geographical region.

5. The computer-implemented method of claim 1, wherein determining the median charge for a respective line item in the subset of items based on historical charges for the respective line item by a corresponding subset of the plurality of medical care providers comprises:

taking the median of the average each respective medical care provider in the corresponding subset of the plurality of medical care provides has charged for the respective line item in a predetermined historical period of time.

6. The computer-implemented method of claim 1, the method further comprising repricing a respective line item in the subset of line items, without human intervention, to a percentage of the median charge for the respective line item.

7. The computer-implemented method of claim 1, the method further comprising generating a request for further documentation for a line item in the subset of line items that has been deemed to not be validly associated with the revenue code.

8. The computer-implemented method of claim 1, wherein the respective line item is deemed to not be validly associated with the revenue code when the respective line item is redundant to a primary line item associated with the revenue code.

9. The computer-implemented method of claim 1, wherein the respective line item is deemed to not be validly associated with the revenue code when the respective line item is deemed to not be used in a medical procedure associated with the revenue code.

10. The computer-implemented method of claim 1, wherein, when a respective line item in the plurality of generic description codes is deemed to not be validly associated with the revenue code, the respective line item is flagged with a code in a predetermined set of codes that is associated with the reason for deeming the respective line item to not be validly associated with the revenue code.

11. The computer-implemented method of claim 1, wherein the matching is performed without human intervention, and wherein the method further comprises providing, in a second single report, a degree of confidence that a line item in the subset of line items has been correctly matched to a corresponding generic description code in the lookup table.

12. The computer-implemented method of claim 11, wherein the second single report comprises, for each respective line item in the subset of line items, a separate row for the respective line item, the separate row comprising an identifier for the respective line item and the generic description code for the respective line item, wherein the separate row for the respective line item is color coded based on a degree of confidence that the respective line item has been correctly matched to the correct generic description code.

13. The computer-implemented method of claim 1, wherein for each respective generic description in the plurality of generic descriptions, the lookup table further comprises one or more synonyms for the respective generic description, wherein the one or more synonyms are originated from line items of medical bills from the plurality of medical care providers, and the matching comprises comparing a respective line item in the subset of line items to each of the one or more synonyms of each respective generic description in the plurality of generic descriptions.

14. The computer-implemented method of claim 13, wherein the matching further comprises determining a degree of confidence for a match between a respective line item in the subset of line items and a synonym of a respective generic description based upon historical matches made for line items from the first medical care provider.

15. The computer-implemented method of claim 13, wherein the lookup table comprises a parent-child relationship between a parent synonym and a child synonym for a generic description, wherein the parent synonym is a classification of the child synonym.

16. The computer-implemented method of claim 14, wherein the lookup table further comprises a grandparent-parent relationship between the parent synonym and a grandparent synonym for the respective generic description, wherein the grandparent synonym provides a mechanism for comparing a charge associated with the child synonym to charges made by providers other than the first medical care provider for the medical service or item associated with the respective generic description.

17. The computer-implemented method of claim 1, wherein the medical bill is a printout or image produced directly by the first medical care provider.

18. The computer-implemented method of claim 1, the method further comprising: rolling, without human intervention, the first single report into a second report that summarizes the first single report, wherein the second report does not include the plurality of line items.

19. The computer-implemented method of claim 18, wherein the second report is based upon UB-04 code levels.

20. The computer-implemented method of claim 1, wherein the identifying, matching, using, and calculating is performed for each revenue code represented on the medical bill, thereby identifying a plurality of subsets of line items, each subset of line items corresponding to revenue code represented on the medical bill, and wherein the first single report provides, for each respective line item in each respective subset of line items in the plurality of subsets of line items, one or more of (i) the charge for the respective line item from the medical bill, (ii) the median charge determined for the respective line item, (iii) a differential between charge for the respective line item and the median charge determined for the respective line item, (iv) the corresponding geographic criterion used to select the subset of the plurality of medical care providers, or (v) any flag associated with the respective line item indicating that the respective line item is potentially not validly associated with the revenue code.

21. A computer system for evaluating medical billing, comprising:

at least one processor;

memory; and at least one program stored in the memory and executable by the at least one processor, the at least one program comprising instructions to:

receive a medical bill and a plurality of line items summarized by the medical bill from a first medical care provider in a plurality of medical care providers;

identify a revenue code in the medical bill, and a subset of line items in the plurality of line items, associated with the revenue code;

match each respective line item in the subset of line items associated with the revenue code to a corresponding generic description code using a lookup table, thereby identifying a plurality of generic description codes for the subset of line items, wherein the lookup table comprises a plurality of generic descriptions, each corresponding to a medical service or item, the lookup table further comprises one or more synonyms for at least one respective generic description, wherein the one or more synonyms are originated from line items of medical bills from the plurality of medical care providers, and for the at least one generic description in the plurality of generic descriptions, the matching comprises comparing a respective line item in the subset of line items associated with the revenue code to each of the one or more synonyms of the at least one generic description in the plurality of generic descriptions;

use the plurality of generic description codes to determine whether each respective line item in the subset of line items is validly associated with the revenue code, wherein, when a respective line item in the subset of line items is deemed to not be validly associated with the revenue code, the line item is flagged as potentially not validly associated with the revenue code;

calculate a median charge for each respective line item in the subset of line items based on historical charges for the respective line item by a corresponding subset of the plurality of medical care providers, wherein the corresponding subset of the plurality of medical care providers is selected from the plurality of medical care providers based upon a corresponding geographic criterion; and provide in a first single report information identifying one or more line items, in the subset of line items, that have been flagged as potentially not validly associated with the revenue code.

22. A non-transitory computer readable storage medium storing at least one program configured for execution by at least one processor of a computer system, the at least one program comprising instructions to:

receive a medical bill, and a plurality of line items summarized by the medical bill, from a first medical care provider in a plurality of medical care providers;

identify a revenue code in the medical bill and a subset of line items in the plurality of line items associated with the revenue code;

match each respective line item in the subset of line items associated with the revenue code to a corresponding generic description code using a lookup table, thereby identifying a plurality of generic description codes for the subset of line items, wherein the lookup table comprises a plurality of generic descriptions, each corresponding to a medical service or item, the lookup table further comprises one or more synonyms for at least one respective generic description, wherein the one or more synonyms are originated from line items of medical bills from the plurality of medical care providers, and for the at least one generic description in the plurality of generic descriptions, the matching comprises comparing a respective line item in the subset of line items associated with the revenue code to each of the one or more synonyms of the at least one generic description in the plurality of generic descriptions;

use the plurality of generic description codes to determine whether each respective line item in the subset of line items is validly associated with the revenue code, wherein, when a respective line item in the subset of line items is deemed to not be validly associated with the revenue code, the line item is flagged as potentially not validly associated with the revenue code;

calculate a median charge for each respective line item in the subset of line items based on historical charges for the respective line item by a corresponding subset of the plurality of medical care providers, wherein the corresponding subset of the plurality of medical care providers is selected from the plurality of medical care providers based upon a corresponding geographic criterion; and provide in a first single report information identifying one or more line items, in the subset of line items, that have been flagged as potentially not validly associated with the revenue code.

* * * * *